CIRCUIT ARRANGEMENT WITH NON-LINEAR DIELECTRIC ELEMENT WITH THERMAL AUTOSTABILIZATION

Filed Nov. 3, 1964

INVENTOR.
MILOS NOVAK, JIRI MASTNER and ZDENEK MALEK
BY
Attorney

United States Patent Office 3,392,340

Patented July 9, 1968

3,392,340
CIRCUIT ARRANGEMENT WITH NON-LINEAR DIELECTRIC ELEMENT WITH THERMAL AUTOSTABILIZATION

Miloš Novák, Jiří Mastner, and Zdeněk Málek, Prague, Czechoslovakia, assignors to Ceskoslovenska Akademie ved, Prague, Czechoslovakia, a corporation of Czechoslovakia Filed Nov. 3, 1964, Ser. No. 408,556
Claims priority, application Czechoslovakia, Nov. 6, 1963, 6,106/63
2 Claims. (Cl. 330—7)

ABSTRACT OF THE DISCLOSURE

An electric circuit arrangement which includes a capacitor that has a non-linear dielectric showing within a certain temperature range a decreasing imaginary component of permittivity with increasing temperature. The non-linear dielectric is heated by high frequency currents due to dielectric losses in said dielectric and its temperature is automatically maintained within said temperature range so that the dielectric losses are in equilibrium with the heat dissipation into ambient space. The heating high frequency current is periodically reduced or suppressed, whereby signal voltages are applied to said circuit within the intervals of reduced or suppressed heating current, thus avoiding interference of the signal and heating circuit.

The invention relates to a circuit arrangement which includes a non-linear dielectric element with thermal autostabilization known under the name of tandel, a heating generator and a signal circuit. Said widely used name "tandel" is an abbreviation for "temperature autostabilized non-linear dielectric element. In accordance with the invention this circuit arrangement comprises an additional circuit which changes periodically the amplitude of the heating voltage of the tandel.

The said tandel or non-linear dielectric element with thermal autostabilization, as disclosed in Czechoslovak Patent No. 121,063, and in the United States patent application Ser. No. 318,302, now Patent No. 3,355,634, issued November 28, 1967, shows high electric non-linearities depend only very little on the ambient temperature. If used in an electronic network, the tandel is connected to a source of alternating voltage which has an amplitude and frequency so selected that the heat developed in the tandel due to dielectric losses is sufficient to bring the tandel into the autostable state and to maintain it therein.

In some special applications it may be disadvantageous to have on the tandel terminals a relatively high alternating voltage whose value cannot be reduced arbitrarily because the autostabilized thermal state must be maintained.

It is a general object of this invention to eliminate the above mentioned drawback. As stated above, the circuit arrangement according to this invention comprises an additional circuit which changes periodically the amplitude of the heating voltage of the tandel. The portion of the cycle during which the heating voltage is reduced or switched off is used for the actual function of the tandel in the signal circuit. The said additional circuit may act directly on the source of the heating voltage or it may be provided by a gate which is connected between the heating source and the tandel and which periodically connects and disconnects the tandel heating voltage.

The invention will be best understood from the following specification to be read in conjunction with the accompanying drawings illustrating examples of preferred embodiments.

Figure 1:
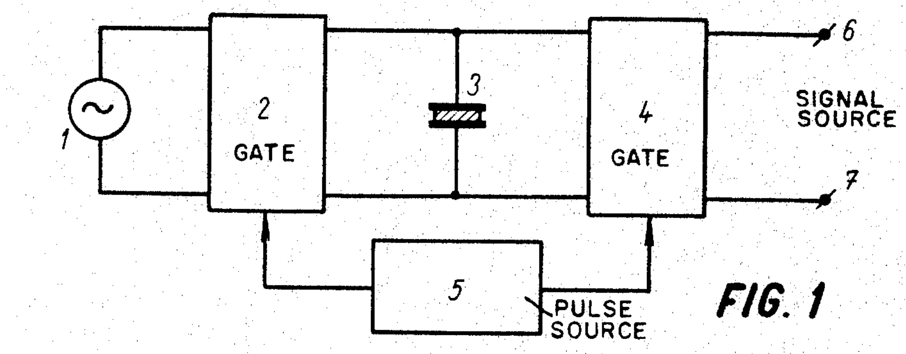
FIG. 1 shows the circuit arrangement in accordance with the invention.

As shown in FIG. 1, the heating voltage source 1 supplies voltage of a suitable frequency and amplitude necessary for heating the tandel 3 into the autostable state. The gates 2 and 4 are controlled by the pulse source 5 in such a manner that they bring the tandel 3 alternately into connection with the terminals of source 1, or with the terminals 6, 7 of the tandel signal circuit. The gates 2 and 4 are controlled by the pulse source 5 in a manner that at the moment when the gate 2 is open, the gate 4 is closed, and vice versa.

Figure 2:
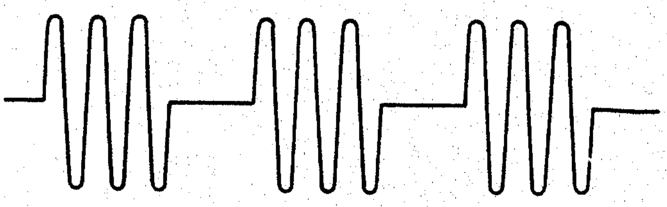
FIG. 2 shows a typical heating voltage curve across the tandel terminals.

FIG. 2 shows a typical heating voltage curve across the terminals of the tandel 3 when the same is heated in the circuit arrangement according to the invention. The repetition frequency and the length of the time interval during which no heating voltage is supplied to the tandel, are determined by the pulse source 5.

In the intervals when no heating voltage is supplied to the tandel 3, the latter works as part of the signal circuit which may supply the tandel with any other voltage, for example a treated signal.

After the heating voltage from source 1 has been switched off, the temperature of tandel 3 drops due to temperature condition into the surroundings. Since the switching-off interval is very short, and heat conduction into the surroundings is low, the temperature of tandel 3 remains practically constant during the whole time in which the gate 2 is closed. The tandel 3 remains therefore in the region of high non-linearities in the region of the Curie point. But if the interval during which the gate 2 is closed is long, the temperature of the tandel 3 is reduced considerably below the Curie point, and after the gate 2 is reopened, the temperature of tandel 3 rises again into the region of the Curie point. During cooling and heating periods, the capacity of the tandel 3 changes considerably due to changes of the dielectric constant with temperature, and the electric non-linearities of the tandel 3 are also varying.

The circuit arrangement for heating the tandel 3 in accordance with the invention permits advantageously in some special applications to make use in periodic intervals of the advantageous electrical properties of the tandel; during this interval the tandel terminals may only be fed with a signal voltage and this prevents for example undesirable penetration of the heating voltage into the signal circuit.

Figure 3:
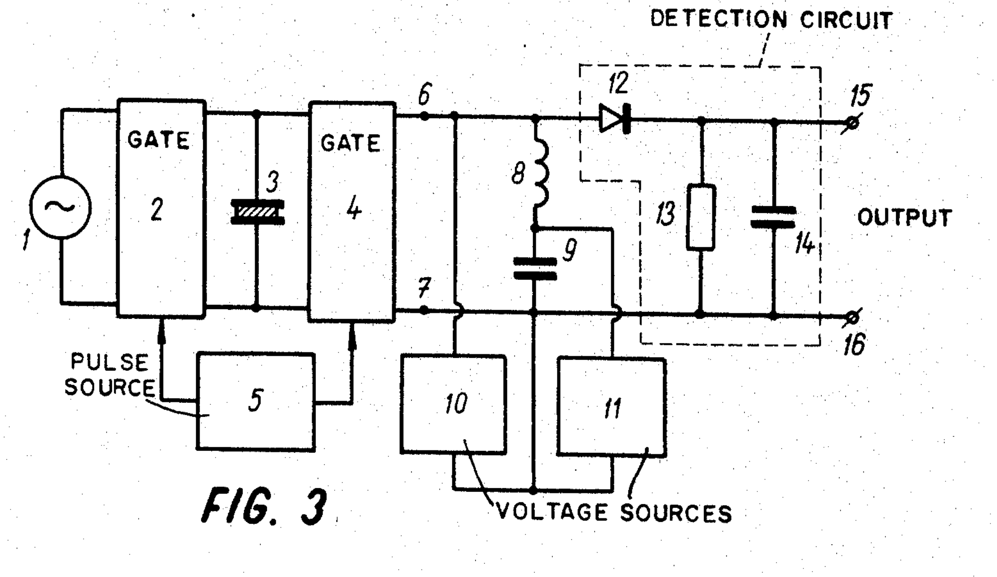
FIG. 3 shows an improved example of embodiment.

A practical embodiment of the invention is illustrated in FIG. 3 which shows a circuit arrangement of a dielectric amplifier; the reference numerals 1 to 7 designate the same elements as in FIG. 1. Said circuit arrangement comprises an inductance 8, which together with the non-linear dielectrical element 3 and the isolating capacitor 9 represents a resonant circuit, and a source 10 of alternating voltage, which is generally called the operating voltage in known dielectric amplifiers. If desired the heating voltage of the non-linear dielectric element 3 could be used as the operating voltage. As however, according to this invention the heating voltage source 1 is periodically suppressed, another high frequency voltage source 10 must be available, its frequency being tuned to the resonant circuit 3, 8, 9; this frequency is amplitude modulated due to detuning of this circuit by the signal voltage source 11 which supplies the amplified signals possibly alternately combined with a source of D.C. voltage. 12, 13 and 14 are conventional elements of a detection circuit and 15, 16 the output terminals of the amplifier.

The general circuit arrangement of FIG. 3 is basically a known circuit arrangement of a dielectric amplifier. However, according to the invention the circuit arrangement works with a tandel which is heated only during one portion of the repetition cycle of the pulse generator 5. The second portion of the cycle namely when the heating voltage from source 1 is switched off is used for the function of the actual amplifier. The amplifier may work with any alternating working voltage from the source 10; this voltage is no longer limited by any requirement of amplitude and frequency suitable for heating the tandel 3.

What we claim is:

1. In an electric circuit arrangement including a nonlinear capacitor having at least two electrodes and a nonlinear dielectric made of a material showing within a certain temperature range a decreasing imaginary component of permittivity with increasing temperature for maintaining said dielectric automatically at a temperature where dielectric losses are in equilibrium with heat dissipation into ambient space, a high frequency heating source connected to said capacitor for heating its dielectric, a signal circuit connected across said capacitor, the improvement comprising switching means periodically interrupting the current from said high frequency heating source and connecting said signal circuit to said capacitor during intervals in which the high frequency heating current is interrupted.

2. A circuit arrangement according to claim 1, wherein said switching means comprises gates alternately connecting the signal circuit and the high frequency heating source to said non-linear capacitor.

References Cited

UNITED STATES PATENTS

| | | | |
|---|---|---|---|
| 2,697,782 | 12/1954 | Lawson | 328—151 |
| 3,172,043 | 3/1965 | Altman | 328—151 X |

ALFRED L. BRODY, *Primary Examiner.*

NATHAN KAUFMAN, ROY LAKE, *Examiners.*